US007278026B2

(12) United States Patent
McGowan

(10) Patent No.: US 7,278,026 B2
(45) Date of Patent: Oct. 2, 2007

(54) METHOD AND SYSTEM FOR THE GENERATION, MANAGEMENT, AND USE OF A UNIQUE PERSONAL IDENTIFICATION TOKEN FOR IN PERSON AND ELECTRONIC IDENTIFICATION AND AUTHENTICATION

(76) Inventor: Tim McGowan, 1025 Connecticut Ave. NW. # 1000, Washington, DC (US) 20036

( * ) Notice: Subject to any disclaimer, the term of this patent is extended or adjusted under 35 U.S.C. 154(b) by 803 days.

(21) Appl. No.: 10/321,472

(22) Filed: Dec. 18, 2002

(65) Prior Publication Data
US 2004/0123114 A1 Jun. 24, 2004

Related U.S. Application Data

(60) Provisional application No. 60/343,600, filed on Jan. 2, 2002.

(51) Int. Cl.
*H04L 9/32* (2006.01)
(52) U.S. Cl. .......................................... 713/186; 283/17
(58) Field of Classification Search ................ 713/186; 283/17
See application file for complete search history.

(56) References Cited

U.S. PATENT DOCUMENTS

| | | | |
|---|---|---|---|
| 4,821,118 A | 4/1989 | Lafreniere | |
| 4,993,068 A | 2/1991 | Piosenka | |
| 4,995,086 A | 2/1991 | Lilley | |
| 5,095,194 A | 3/1992 | Barbanell | |
| 5,280,527 A | 1/1994 | Gullman et al. | |
| 5,325,442 A | 6/1994 | Knapp | |
| 5,351,303 A | 9/1994 | Willmore | |
| 5,613,012 A | 3/1997 | Hoffman | |
| 6,490,680 B1 | 12/2002 | Scheidt et al. | |
| 6,715,674 B2* | 4/2004 | Schneider et al. | 235/382 |
| 2001/0037451 A1* | 11/2001 | Bhagavatula et al. | 713/155 |
| 2002/0095588 A1* | 7/2002 | Shigematsu et al. | 713/186 |
| 2002/0122571 A1* | 9/2002 | Bradley et al. | 382/115 |
| 2002/0178364 A1* | 11/2002 | Weiss | 713/182 |
| 2003/0046555 A1* | 3/2003 | Bradley et al. | 713/186 |
| 2003/0163708 A1* | 8/2003 | Tang | 713/185 |
| 2004/0002894 A1* | 1/2004 | Kocher | 705/13 |
| 2004/0017934 A1* | 1/2004 | Kocher | 382/125 |
| 2005/0235148 A1* | 10/2005 | Scheidt et al. | 713/168 |

OTHER PUBLICATIONS

AAMVA National Standard for the Driver License/Identification Card, AAMVA DL/ID -2000 AAMVA Jun. 30, 2000, 90 pages.

* cited by examiner

*Primary Examiner*—Matthew B Smithers
(74) *Attorney, Agent, or Firm*—Dann, Dorfman, Herrell & Skillman, PC

(57) ABSTRACT

An apparatus and methods for implementing a secure personal identification Token are disclosed. The Token may utilize biometric matching, encryption, access codes, holograms, and bar codes to improve security and confidentiality of data relating to the holder of the token. To further improve security, methods of ensuring the uniqueness of the holder may be implemented. Methods to protect unauthorized access to a holder's Token are also disclosed.

16 Claims, 5 Drawing Sheets

METHOD AND SYSTEM FOR THE GENERATION, MANAGEMENT, AND USE OF A UNIQUE PERSONAL IDENTIFICATION TOKEN FOR IN PERSON AND ELECTRONIC IDENTIFICATION AND AUTHENTICATION

CROSS-REFERENCE OF RELATED APPLICATIONS

This application claims the benefit of priority to U.S. Provisional Application No. 60/343,600 filed Jan. 2, 2002.

STATEMENT REGARDING FEDERALLY SPONSORED RESEARCH OR DEVELOPMENT:

There was no federally sponsored research or development in the creation or design of the subject matter of this patent application.

REFERENCE TO SEQUENCE LISTING, A TABLE, OR COMPUTER PROGRAM LISTING COMPACT DISK APPENDIX:

Not applicable.

FIELD OF INVENTION

The present invention relates to a method and system for the generation, management, and use of a Unique Personal Identification Token. Once the Token has been issued to an individual, the individual may store information in a secure electronic format for use in various interactions.

BACKGROUND OF THE INVENTION

This invention addresses and solves the six primary shortcomings of existing prior art and current implementations of electronic tokens. The shortcomings being:

1. Tokens are issued by a commercial or government entity for a specific use within a limited environment. Such as the U.S. Department of Defense Common Access Card or the American Express Blue card. Use of the Common Access Card is limited to the Department of Defense, select government agencies, and specific authorized contractors. The American Express Blue card is limited to a select number of American Express customers and merchants, the electronic portion of the card holds little data and is not used by most of the merchants.

2. There is no certainty of the identity of the holder when prior art tokens are issued, nor is there high assurance the holder has not been issued a prior token under the same or different identity. The Department of Defense checks certain personnel records and files before issuing a Common Access Card. Based on the accuracy of the databases these checks may prevent issuance of a token under an assumed name. American Express performs a credit check before issuing a Blue card. There is no restriction that would prevent an individual from obtaining multiple American Express Blue cards under the same name. And with effort an individual can obtain one under a fictitious name. Other prior art use biometrics to provide a personal identification (U.S. Pat. No. 4,993,068 to Piosenaka et al, U.S. Pat. No. 5,095,194 to Barbanell) but only in the context of matching a biometric stored on a token to a biometric captured at the time of identification request. In some instances of prior art multiple biometrics are stored on the token and matched off the token at time of use. This adds assurance the person is the one the token has been issued to, or for. It does not assure uniqueness in the issuance process.

3. In prior art data stored on the token is either not encrypted and easily machine readable or encrypted with a limited number of encryption keys thereby increasing the likelihood private data may become available to unauthorized parties. The possibility that data is released to unauthorized parties further restricts widespread use of prior art tokens and raise concerns of privacy advocates. Current standards published by the American Association of Motor Vehicle Administrators explicitly states data stored on an electronic token (i.e. smart card) shall not be encrypted. Storing data on the token unencrypted raises a number of issues relating to privacy, security, liability, unauthorized data collection and generally limits acceptance of the prior art token. In another example the Department of Defense Common Access Card uses only one encryption key to encrypt all data stored on the token. This includes personnel as well as medical data. Anyone with the proper decryption key can read all of the information stored on the Common Access Card. Unauthorized access to medical data is a violation of Federal Law. Use of the Common Access Card outside the realm of the Department of Defense is in violation of Federal Law. Some prior art propose the use of multiple asymmetrical key pairs to encrypt data on the token. These have not been implemented. And the strength of the encryption algorithms is intentionally limited to weak/medium encryption to meet U.S. export restrictions on encryption technology.

4. Prior art that utilizes biometrics to validate the holder to the token match the biometric off the token. This requires the biometric template stored on the token be transferred from the token to an external processor. This process jeopardizes the security of the match in that the biometric template from the token once it leaves the token can be stored or transferred without the holder's knowledge or permission.

5. Prior art does not address universal real time authentication. American Express Blue embodies in the system real time authentication for the purpose of authenticating the token for a commercial transaction within a closed community. The Department of Defense Common Access Card relies on Public Key Infrastructure technologies for authentication. This has proven so cumbersome in practice the Department of Defense has declared the Common Access Cards to be valid for a period of two years from issuance.

6. In prior art data is stored on the tokens by the issuing authority. In the case of the Department of Defense Common Access Card the Department of Defense stores identification, personnel, and medical data on the token at issuance. This limits the validity of time sensitive data, such as rank and also raises policy issues of privacy of data.

BRIEF SUMMARY OF THE INVENTION

The method and system for the generation, management, and use of a Unique Personal Identification Token for in person and electronic identification and authentication is defined in the steps below. The applicant for a Unique Personal Identification Token shall submit to an issuing government agency certain information and one or more biometric to establish the applicant does not have a valid Unique Personal Identification Token. If the applicant does not have a valid Unique Personal Identification Token one will be issued to the applicant. As the Unique Personal Identification Token is issued a mathematical representation of one or more unique biometric shall be stored on the Unique Personal Identification Token. The mathematical representation of the biometric(s) shall not be removed from or copied from the Unique Personal Identification Token. Other data stored on the Unique Personal Identification Token will include one or more access codes. Data on the Unique Personal Identification Token will be digitally signed. Many data elements will also be encrypted with asymmetric cryptographic means. Data may be printed on the exterior of the Unique Personal Identification Token in human readable format or other means such as 2-D bar code.

Each time the holder elects to use the electronic format of the Unique Personal Identification Token the holder must supply said access code. The holder must also supply one or more biometrics for reduction to a mathematical representation. Said access code and said biometric mathematical representations supplied by the holder will be compared to the access code and biometric mathematical representations stored on said Unique Personal Identification Token. If said access codes and said biometric mathematical representations match, the holder is identified as the party to whom said Unique Personal Identification Token was originally issued.

There is a further real time means to establish said Unique Personal Identification Token has not been revoked by the issuing government agency, nor suspended by the holder, thereby authenticating the current validity of said Unique Personal Identification Token.

The invention provides for a method and system to issue a single, unique identification token where the holder has complete control over the use of data stored in electronic media. Further the holder determines what discretionary data is stored on the electronic medium and when said discretionary data may be accessed.

Audit records will be generated and retained for all steps in said method and system.

DETAILED DESCRIPTION OF THE PREFERRED EMBODIMENT

Figure 1:
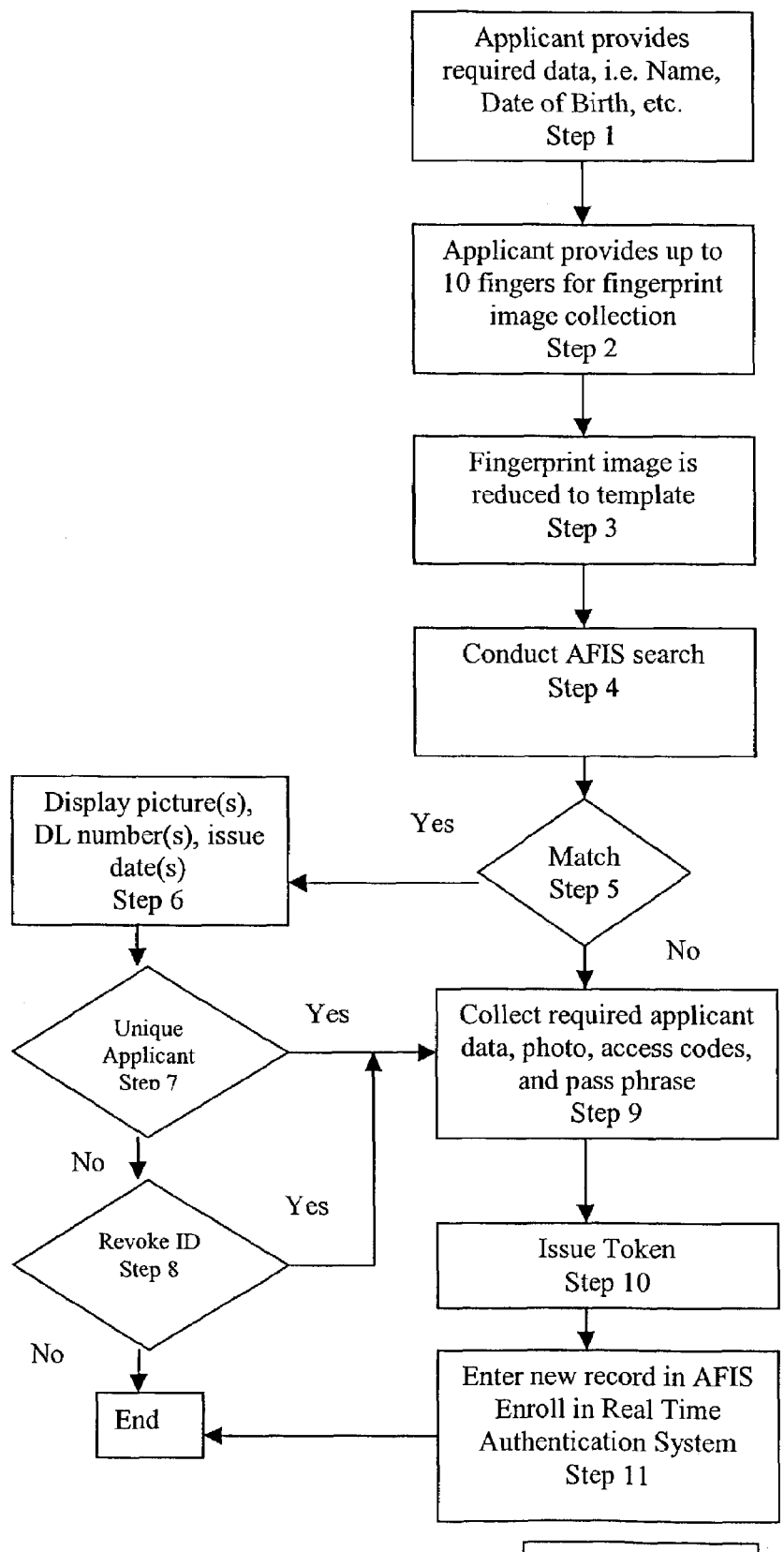
FIG. 1 is a flow chart of the enrollment and issuance process.
Figure 2:
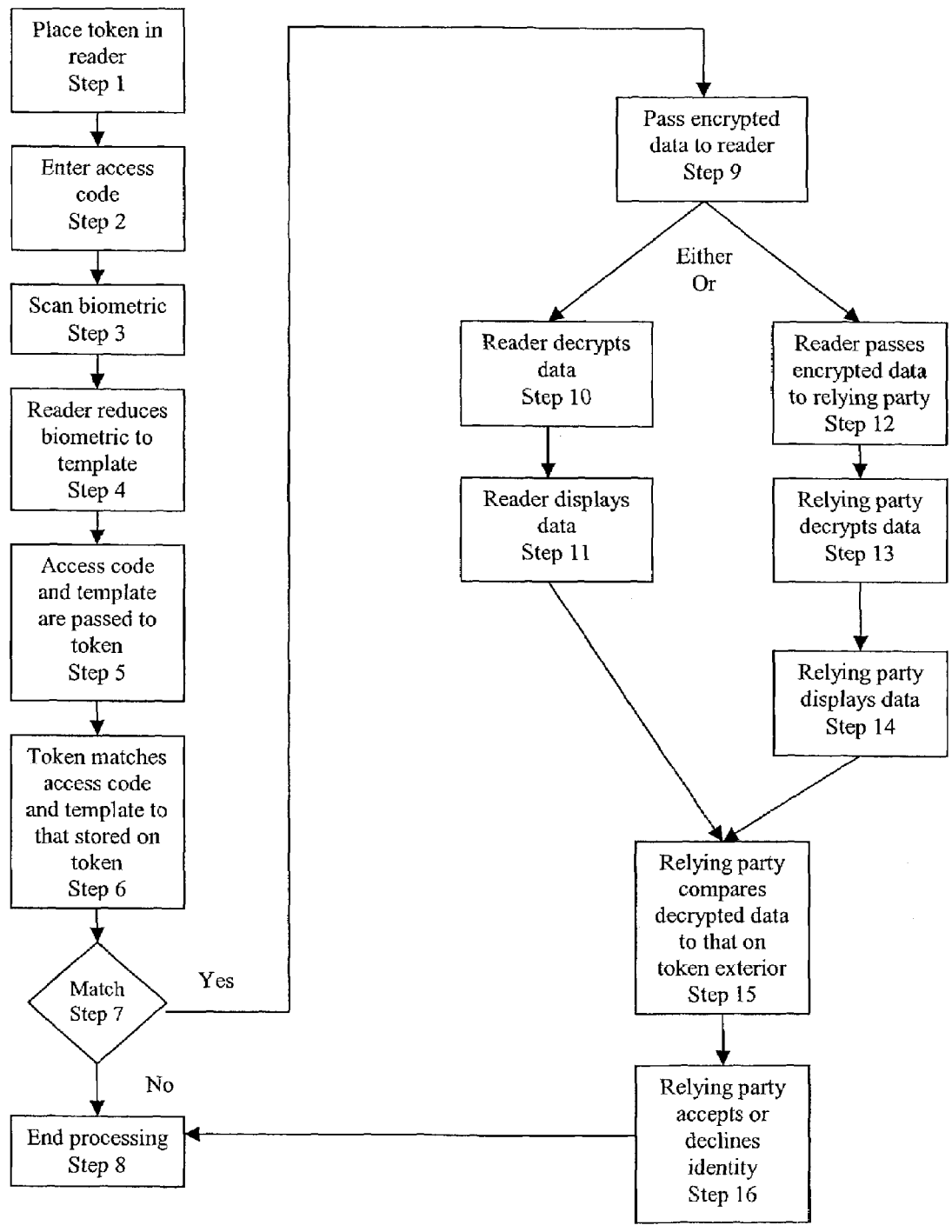
FIG. 2 is a flow chart of stand-alone electronic identification and authorization of the holder.
Figure 3:
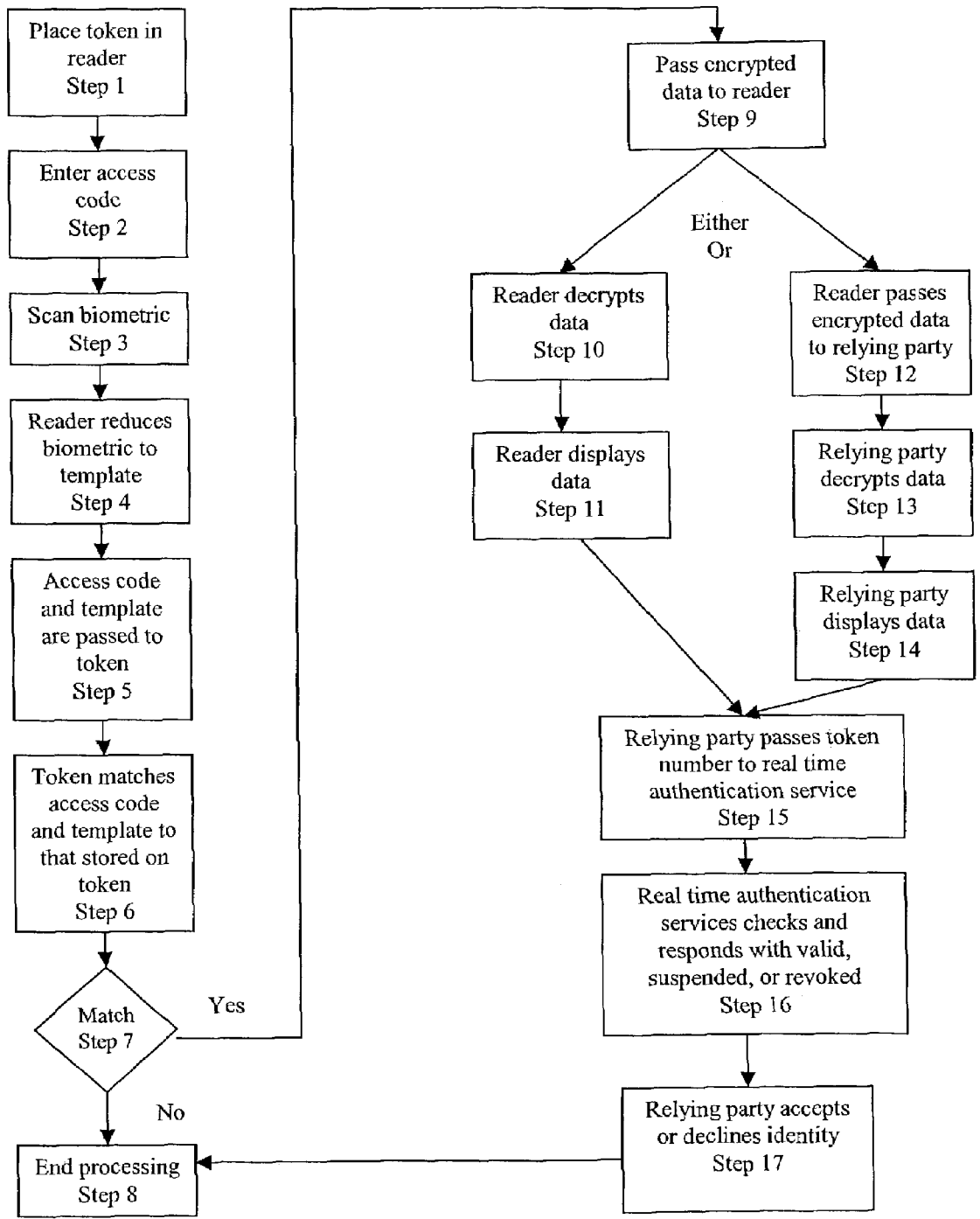
FIG. 3 is a flow chart of the electronic identification and authorization of the holder with real time authentication.
Figure 4:
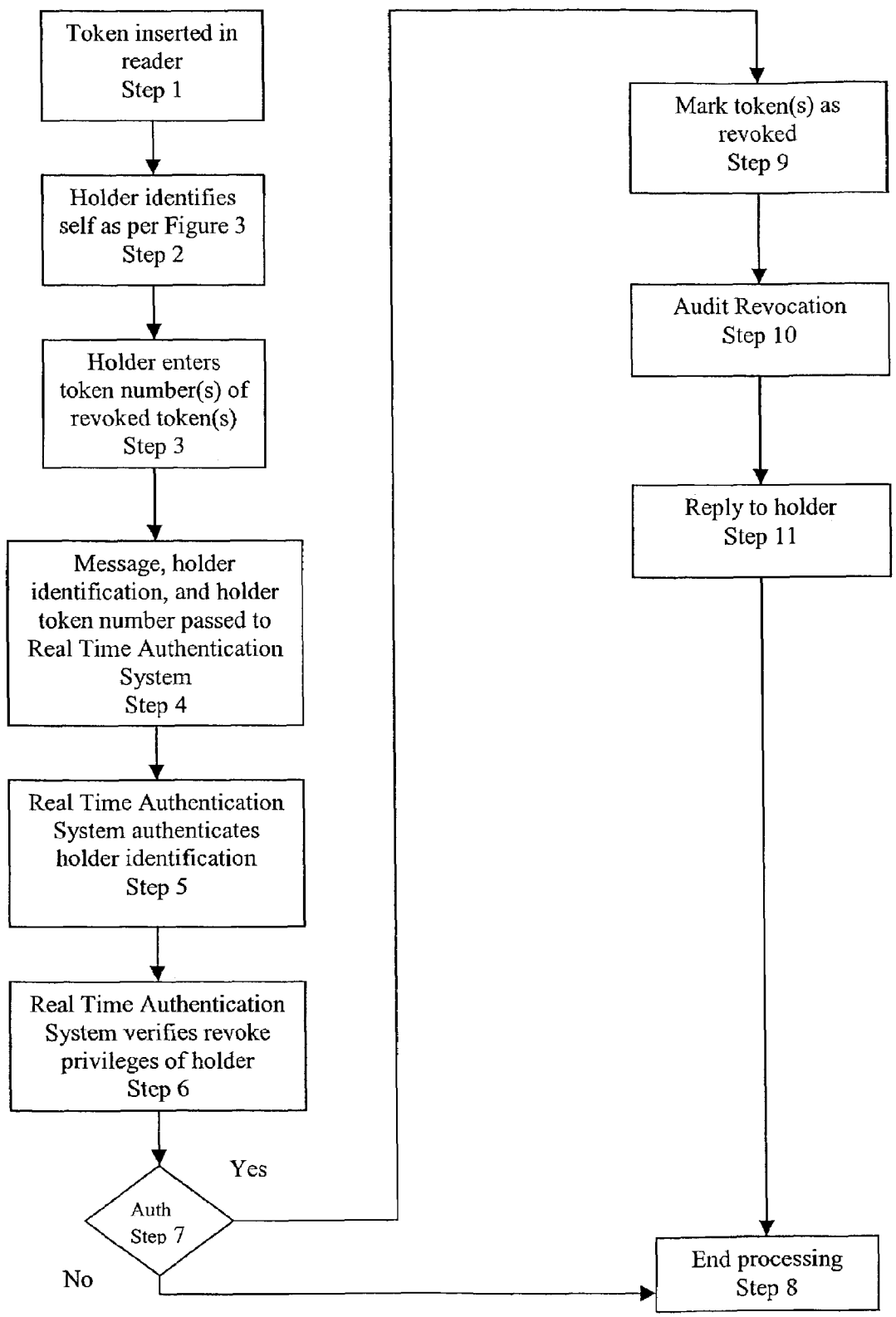
FIG. 4 is a flow chart of the revocation of a Universal Personal Identification Token.
Figure 5:
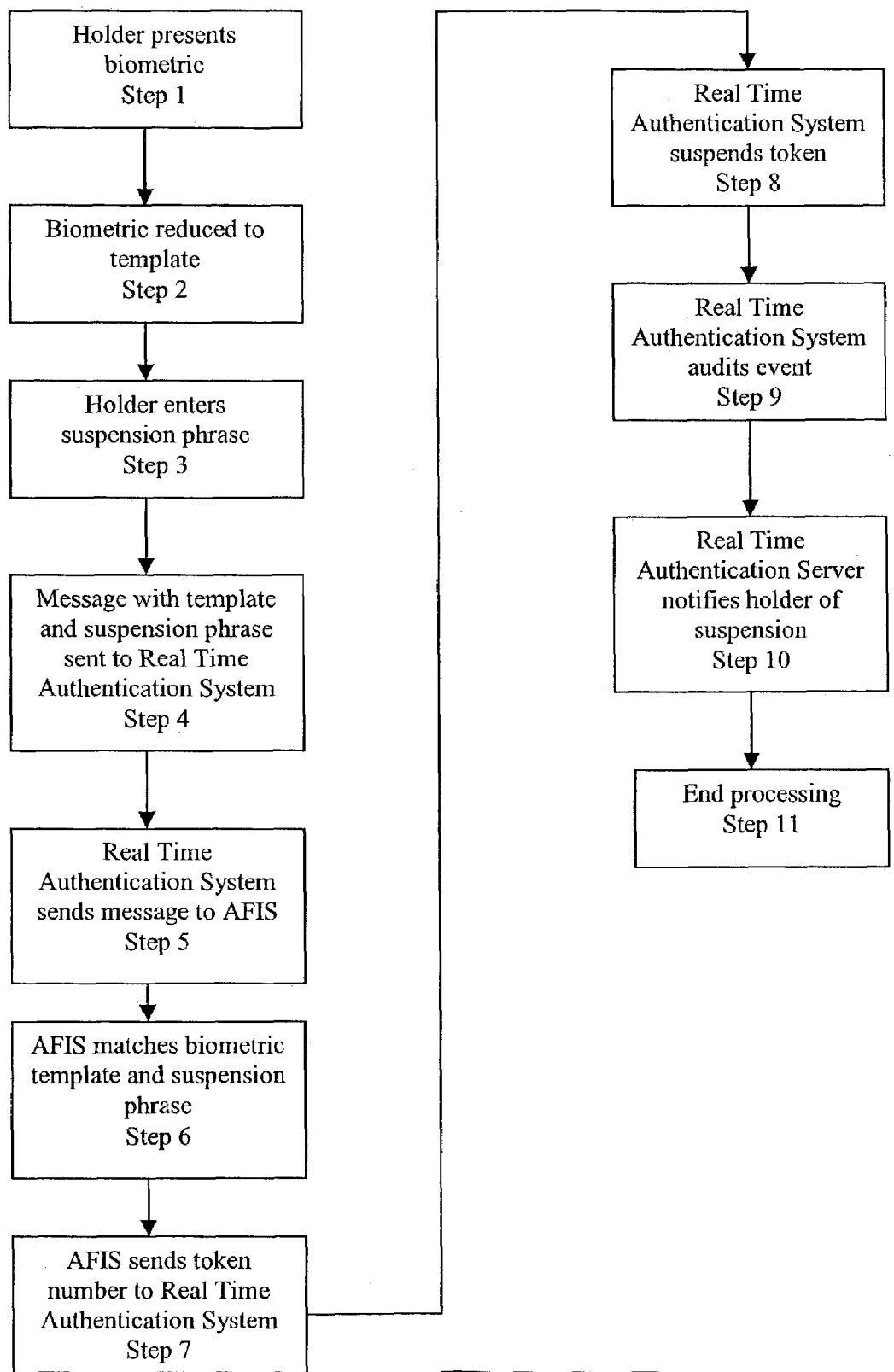
FIG. 5 is a flow chart of the suspension of a Universal Personal Identification Token.

This Unique Personal Identification Token will be issued in cooperation with a government agency, most commonly a state motor vehicle administration consistent with the requirements of this invention and in accordance with existing standards. The Unique Personal Identification Token will be available to provide holder identification and authentication for any government, commercial, and personal use where unique identification and authentication is desired.

This Unique Personal Identification Token will utilize biometrics to assure that only one token is issued to each holder. Each applicant for a Unique Personal Identification Token will be required to present one, or more biometric to be searched against a database of biometrics associated with every Unique Personal Identification Token issued in the past. If a match is found, the issuing government agency shall make a determination that the applicant is a holder of a previously issued Unique Personal Identification Token based on biometric and other information, or require the applicant turn to in any Unique Personal Identification Token issued to the applicant in the past, thereby assuring each person has only one valid Unique Personal Identification Token at any one period in time.

This Unique Personal Identification Token uses a patented encryption mechanism to allow multiple large key encryption key pairs to protect data on the Unique Personal Identification Token from unauthorized disclosure and conform to U.S. Government export control laws. Parties relying on the Unique Personal Identification Token for identification and authentication are limited by the multiple encryption mechanisms to decrypt only pre-authorized data on the Unique Personal Identification Token by the decryption keys the relying party is given access to.

The Unique Personal Identification Token will perform 1:1 biometric matching on the Unique Personal Identification Token itself. The biometric template(s) stored on the Unique Personal Identification Token at issuance will not leave the Unique Personal Identification Token. A biometric from the holder captured on an external processor upon request of identification or authentication will be reduced to a template and transferred to the Unique Personal Identification Token for matching. The match between said captured biometric template and the said stored biometric template will be scored based on similarities. A score above a threshold will be considered a match for further processing on the Universal Personal Identification Token. The Unique Personal Identification Token will return said score to the external processor indicating the degree to which the two biometric templates match. The relying party may elect to accept the identity based on the score.

The Unique Personal Identification Token incorporates existing commercial real time authentication technologies to enable the issuing government agency to revoke the use of the Unique Personal Identification Token for identification and authentication in real time. The same commercial technology enables the holder to suspend use of other data stored on the Unique Personal Identification Token.

The Unique Personal Identification Token defines three sets of data: issuer supplied data, holder supplied data, and commercial data. The issuing government agency supplies only the identification data, such as name, address, data of birth, etc. This data is stored on the Unique Personal Identification Token at issuance and is not modified or deleted. The holder is given the option to add certain data to the Unique Personal Identification Token, such as medical data and other personal data of commercial nature such as account names and numbers. Commercial data consists of one or more blocks of encrypted data stored on the Unique Personal Identification Token with the concurrence of the holder by another entity. An example of this may be the holder permitting his employer to store personnel data on the Unique Personal Identification Token. Initial storage and subsequent use of this block of data requires the concurrence of the holder. This division of data stored on the Unique Personal Identification Token minimizes the concerns of privacy advocates by giving the holder the right to decide what data, other than the initial identification data stored by the issuing government agency, is stored on the Unique Personal Identification Token and whom may access the data An applicant for a Unique Personal Identification Token must complete a form supplying information such as name, address, and other information the issuing authority requires.

Said information may be retrieved from an existing database and displayed for editing. The applicant must also submit to having a facial picture taken and present up to ten fingers to a fingerprint reading device for capture of the fingerprint images. Said fingerprint images are reduced to a mathematical representation commonly known as a template. Said template is used to search a single database of all fingerprint templates for all previously issued Unique Personal Identification Tokens. Use of a single database for all issuing agencies prevents one applicant from receiving more than one Unique Personal Identification Token from a single issuing authority or from different issuing agencies and is a unique and novel step from all prior art. The image capture, template creation, and searching means is commonly referred to as an Automated Fingerprint Identification System (AFIS). If there is no match with stored templates the applicant is deemed to be unique and is issued a Unique Personal Identification Token. The applicant who has been issued a Unique Personal Identification Token is referred to as the "holder". The Unique Personal Identification Token itself will be owned and property of the issuing authority.

Said multiple fingerprint template and corresponding picture will be stored in the AFIS system for comparisons with future Unique Personal Identification Token applicants. Each data record in the AFIS will contain a reference number to associate with the issued Unique Personal Identification Token.

If there are one or more matches within said AFIS database the issuing authority shall use said picture(s), and said corresponding multiple fingerprint matching template(s) and information presented by the applicant to determine if any of the reported matches are the applicant. If the issuing authority determines the applicant matches one already in the AFIS the applicant will be required to surrender the existing Unique Personal Identification Token or be denied a new Unique Personal Identification Token.

In this embodiment the Unique Personal Identification Token is an industry standard smart card. In other embodiments the Unique Personal Identification Token may be other portable computer device capable of running an operating system, running applications, storing data, and communicating with other electronic devices.

In other embodiments one or more different biometric may be used, for instance iris, facial image, voice pattern, etc.

In other embodiments the issuing authority may be a commercial entity.

In other embodiments the issuing authority may also verify the information provided by the applicant as part of the process to establish identity. This may include checking the validity of an address, birth certificate, social security number, etc.

Each issuing authority shall determine the data to be collected from the applicant. The set of information to be printed on the exterior of the Unique Personal Identification Token shall conform to the minimum data set established by the American Association of Motor Vehicle Administrators (AAMVA), an organization to which all U.S. state motor vehicle agencies belong. Each issuing authority shall determine the format of the exterior of the Unique Personal Identification Token issued by said issuing agency including but not limited to color, images, human readable text, inks, bar codes, holograms, and all means for detecting and/or preventing tampering with the exterior of the Unique Personal Identification Token. During the token manufacturing process all raw materials are tracked to maintain positive control and minimize loss.

A means exists to record the individual issuing the Unique Personal Identification Token and shall be maintained for audit and tracking purposes.

In other embodiments data on the exterior of the token may conform to other standards.

The applicant will be required to define a primary access code, a distress access code, and a suspension phrase. A Unique Personal Identification Token shall be created with the exterior format as defined by the issuing authority. The issuing authority will select data collected from the applicant for storage on the electronic memory of the Unique Personal Identification Token. This data shall be stored in the AAMVA format. Contrary to the published AAMVA standards the data will be encrypted. The preferred embodiment uses Constructive Key Management technology developed by TECSEC, Inc. of McLean, Va. Constructive Key Management allows for the use of long encryption key pairs and encryption of each data object. The ability to separately encrypt each data object, or data element assures privacy of data. A means exists within Constructive Key Management to distribute decryption keys to authorized relying parties based on the data objects to be decrypted.

In another embodiment other encryption means may be used.

Additional data stored in the electronic memory of the Unique Personal Identification Token will include said primary access code, said distress access code, and biometric templates from at least two single fingers. All data stored in the electronic memory of the Unique Personal Identification Token shall be digitally signed. Access codes will be one way encrypted in accordance with common industry practices for access codes and passwords.

The invention includes a means whereby the Unique Personal Identification Token shall be printed. Digitally signed and encrypted data shall be loaded onto the electronic media of said Unique Personal Identification Token. The holder will be required to enter said primary access code and present a finger for identification prior to being given said Unique Personal Identification Token. Upon issuance the number of said Unique Personal Identification Token will be stored in the real time authentication service database with data identifying the issuing authority.

In another embodiment additional finger biometric templates, and/or templates from other biometrics may also be stored on said Unique Personal Identification Token for 1:1 matching.

The invention includes a means whereby the holder can use said Unique Personal Identification Token to establish identity three ways depending on the situation, and the requirements of the person seeking to know the identity of the holder, referred to as the "relying party".

1. The holder can physically present said Unique Personal Identification Token to the relying party. The relying party may observe and read the exterior of said Unique Personal Identification Token to establish the holder's identity. This is very similar to the current practice of using a driver's license for identification at a bank today.

2. The holder may permit the relying party to access the data stored on the electronic memory of the Unique Personal Identification Token. In this instance the relying party may be face-to-face or remote from the holder with communications across a network such as a Virtual Private Network or the Internet. To permit access to the data stored on the electronic memory of said Unique Personal Identification Token, the holder places the Unique Personal Identification Token in a Unique Personal Identification Token reader. The Unique Personal Identification Token reader has a means to collect both an access code and one or more biometric templates. Said access code and biometric template(s) are transmitted to said Unique Personal Identification Token and matched against the primary access code and biometric templates stored on said Unique Personal Identification Token. Match of the primary access code is binary, yes or no. In said matching of said template a reliability score is established based on the correlation of the stored and current template. If the primary access code and the biometric templates match, a subset of said identification data and said reliability score is sent to the relying party. Said relying party must have the proper decryption keys to decrypt and read the data sent from said Unique Personal Identification Token. Said relying party uses said reliability score in electing to rely on said identity information provided. Should said relying party elect to accept the identity of the holder said relying party may decrypted data to establish the identity of the holder. If this is a face-to-face transaction, like a police traffic stop or request for access to a building said relying party may also compare said decrypted electronic data to the information on the exterior of said Unique Personal Identification Token, further validating the identity of said holder.

Another embodiment the Unique Personal Identification Token may be a contactless, or wireless device.

The holder may elect to enter the distress access code for matching. In that case the means for matching data on said Unique Personal Identification Token will first match against said stored primary access code. When a non-match is established the means will match against the stored distress access code and biometric template(s) on said Unique Personal Identification Token. If there is a match said relying party will be sent a code to indicate said holder entered said distress access code along with the information from said Unique Personal Identification Token. The relying party may elect to take different actions based on the entry and notification of use of the distress access code. The purpose of the distress access code is to indicate to the relying party that the holder is entering the access code under duress. For example the holder may be someone kidnapped by a car hijacker and the relying party may be a police officer stopping the car. The kidnapper would not know the primary access code from the distress access code. But the police officer would be warned the holder entered the distress access code. The police officer may choose to release the holder and follow the car, or detain everyone in the car. Likewise the distress code could provide the same warning if used in an electronic transaction like an Automated Teller Machine cash withdrawal.

3. Said Unique Personal Identification Token could be used as in example two above with additional authentication. The relying party may choose to communicate with said real time authentication service. The relying party would send said Unique Personal Identification Token number to said real time authentication service across a communications network, such as the Internet requesting authentication. The Unique Personal Identification Token number includes a code identifying the issuing agency. Said real time authentication service would check to see if said Unique Personal Identification Token had been issued by said issuing authority and not revoked by the issuing authority or suspended by the holder. Said real time authentication service would return a message to said relying party indicating said Unique Personal Identification Token was at that point in time suspended, revoked, or still valid.

In this embodiment the aSuretee (SM) real time authentication service shall be provided by First aSuretee, LLC a subsidiary of First Data Corporation. In other embodiments other means of real time authentication may be used.

The three levels of identification and authentication provided by said Unique Personal Identification Token can be used for physical identification, logical identification, or electronic commerce. Each relying party may establish their own database of privileges or authorizations based on said Unique Personal Identification Token. Databases established by a relying party could be a list of holders permitted access, or a list of holders to deny access. A list of holders permitted access to a building is an example of the first, and a known offender list is an example of the latter. In either event the database is outside the scope of this invention. By excluding the privileges databases said Unique Personal Identification Token avoids many privacy issues and eliminates the need to administer and control privilege. Likewise the holder's privileges are not written in the electronic memory of said Unique Personal Identification Token.

The invention includes a means whereby the issuing authority, with proper identification and authority may at any time transmit a message to said real time authentication service revoking a specific Unique Personal Identification Token. Upon receipt of said message said real time authentication service will respond to all future inquiries by any relying party making inquiry that said Unique Personal Identification Token has been revoked by the issuing authority. This assures that even though said Unique Personal Identification Token was issued and considered valid at the time of issuance said Unique Personal Identification Token may be invalidated at any time.

The invention includes a means whereby the holder may at any time transmit a message to said real time authentication service suspending the holder's Unique Personal Identification Token. The message must contain the holder's biometric template and said suspension phrase for said Unique Personal Identification Token. Upon receipt of said message the real time authentication service will respond to all relying parties making inquiry that said Unique Personal Identification Token had been suspended. The holder may at a later time cancel said suspension by sending a re-authentication message to said real time authentication service in a manner similar to the suspension means.

The invention includes a means whereby once said Unique Personal Identification Token is issued to the holder the holder may elect to add additional data to the electronic memory of said Unique Personal Identification Token. It is envisioned the holder may elect to store medical information, account information for various credit and savings accounts, and/or loyalty account information such as frequent flier account numbers.

Said data will be encrypted using Constructive Key Management. Once stored on said Unique Personal Identification Token access to the encrypted data is only possible when the holder provides both an access code and said biometric template. Even then, the relying party will be given encrypted data and must have the corresponding decryption key to understand and use the data.

In another embodiment access to certain data may be available to specific relying parties without the holder's access code and biometric. The election to make this data available by this means would be at the discretion of the holder. The holder would elect to make said data available at the time they utilized the means to write said data to said Unique Personal Identification Token, thereby ensuring holder control of said data. For instance certain emergency medical data may be available to emergency medical technicians. A prime example of this would be in the event the holder was unconscious and unable to provide said primary access code and said biometric.

The invention includes a means whereby said holder of said Unique Personal Identification Token may elect to permit the storage of blocks of encrypted data in the electronic memory of said Unique Personal Identification Token. Said holder shall place the Unique Personal Identification Token in a Unique Personal Identification Token reader and provide both said primary access code and said biometric to provide access to said electronic memory of said Unique Personal Identification Token. The writer of said block of data will provide to said Unique Personal Identification Token a unique numeric key which authorizes writing to a specific block of said Unique Personal Identification Token electronic memory. Once written, said block of encrypted data is available to a reader only after said holder supplies said primary access code and said biometric.

OPERATION

The Main Embodiment of the Invention Would Operate as Follows:

The applicant would request a Unique Personal Identification Token from a government agency by supplying certain information and biometrics. The government agency would issue the Unique Personal Identification Token providing the applicant does not currently hold a Unique Personal Identification Token, or the applicant revokes all previous Unique Personal Identification Tokens issued to the applicant.

Once issued, the holder of the Unique Personal Identification Token can use the Unique Personal Identification Token to identify and authenticate himself or herself by:

1. Physically providing the Unique Personal Identification Token to a relying party for the relying party to read the exterior of the Unique Personal Identification Token.
2. Physically providing the Unique Personal Identification Token to a Unique Personal Identification Token reader along with an access code and biometric for matching against data stored on the Unique Personal Identification Token for the relying party to read both the electronic data and the exterior of the Unique Personal Identification Token.
3. By taking the steps in step 2 with the relying party further checking the Unique Personal Identification Token with the real time authentication server to assure the Unique Personal Identification Token has not been revoked or suspended.

In authentication methods 2 and 3 the relying party may be face-to-face with the holder or physically removed from the holder, but connected by an electronic communications method.

The issuing agency can at any time revoke an issued Unique Personal Identification Token by notifying the real time authentication server.

The holder can suspend said Unique Personal Identification Token by notifying the real time authentication server. Likewise the holder can revoke the suspension by notifying the real time authentication server.

CONCLUSION, RAMIFICATIONS, AND SCOPE OF INVENTION

Thus the reader will see the Unique Personal Identification Token of the invention has many applications for uniquely identifying an individual for government, business, commercial, and personal use.

While my above description contains many specificities, these should not be construed as limitations on the scope of the invention, but rather as an exemplification of one preferred embodiment thereof. Many other variations are possible. For example addition of specific data fields in the electronic memory may add value for certain relying parties.

Accordingly, the scope of the invention should be determined not by the embodiments illustrated, but by the appended claims and their legal equivalents.

I claim:

1. A method of issuing a unique personal identification token comprising the steps of:
   a. Receiving identity and biometric information to assist in establishing a unique identity,
   b. Searching a database before issuing the token to determine whether a token was previously issued to a person having said identity and biometric information,
   c. Registering the identity and biometric information in the database, and
   d. Issuing the token.

2. The method of claim 1, further comprising the step of storing biometric and identity information in a memory of the token.

3. A method for determining whether a person in possession of a token is authorized to use the token, said method comprising the steps of:
   a. Presenting a token to a relying party, said token comprising a memory containing a stored biometric template and a stored access code,
   b. Collecting biometric data from the person,
   c. Collecting an access code from the person,
   d. Reducing said biometric data to a template,
   e. Executing a program stored in the memory of the token that determines whether the stored access code matches said code collected in step c,
   f. Outputting the result of the program of step e,
   g. Executing a program stored in the memory of the token that calculates a reliability score based on the correlation of the template collected in step b and the biometric template stored in the memory of the token,
   h. Outputting the result of the program of step g, and
   i. Using the results of steps f and h to determine whether the person in possession of the token is authorized to use the token.

4. The method of claim 3, further comprising the steps of:
   a. withdrawing decrypted electronic data from the token, and
   b. comparing said decrypted electronic data to information provided on the exterior of the said token.

5. The method of claim 3, further comprising the steps of: submitting a unique number associated with said token to an external database, and receiving revocation and suspension information relevant to said unique number.

6. The method of claim 3, further comprising using information provided on the exterior of the token in conjunction with results of steps f and h to determine whether the person in possession of a token is authorized to use the token.

7. The method of claim 6, wherein the exterior information is a photo of the applicant.

8. The method of claim 6, wherein the exterior information is a bar code.

9. The method of claim 3, further comprising the step of using a token reader to perform steps b and c.

10. A method of accessing information stored in a memory of a token comprising the steps of:
   a. Providing a token with a memory for storing information,
   b. Storing an access code in the memory of the token,
   c. Providing a suspension phrase used to notify a relying party that reliance on the token has been suspended,
   d. Storing a distress access code in the memory of the token, and
   e. Notifying a relying party that the holder of the token is in distress by using said distress access code.

11. The method of claim 10, further comprising the step of storing a biometric template in the memory of the token.

12. The method of claim 10, further comprising the step of querying a real time authentication service to determine whether use of the token has been suspended.

13. A method of accessing information stored in a memory of a token comprising the steps of:
   a. Providing a token with a memory for storing information,
   b. Storing an access code in the memory of the token,
   c. Providing a suspension phrase used to notify a relying party that reliance on the token has been suspended,
   d. Storing a distress access code in the memory of the token, and
   e. Providing said suspension phrase to a real time authentication service to suspend reliance on the token.

14. The method of claim 13, further comprising the step of querying a real time authentication service to determine whether use of the token has been suspended.

15. A method of issuing a unique personal identification token comprising the steps of:
   a. Receiving identity and biometric information to assist in establishing a unique identity,
   b. Reducing the biometric information to a template,
   c. Searching a database before issuing the token to determine whether said template matches any existing templates stored in the database,
   d. Registering the identity and biometric information in the database, and
   e. Issuing the token.

16. The method of claim 15, comprising the step of searching a database before issuing the token to determine whether said identity information matches any existing identity information stored in the database.

* * * * *

UNITED STATES PATENT AND TRADEMARK OFFICE
CERTIFICATE OF CORRECTION

PATENT NO. : 7,278,026 B2
APPLICATION NO. : 10/321472
DATED : October 23, 2007
INVENTOR(S) : Oommen It is certified that error appears in the above-identified patent and that said Letters Patent is hereby corrected as shown below:

Column 4
Line 25, delete "for $1 \leq i \leq |T_1|$, $1 \leq j \leq |T_2|$, and $1 \leq s \leq Min$" and insert -- for $1 \leq i \leq |T_1|$, $1 \leq j \leq |T_2|$, and $1 \leq s \leq Min$ --
Line 34, delete "$\delta_1(i) \leq i_1 \leq i$, $\delta_2(j)$" and insert -- $\delta_1(i) \leq i_1 \leq i$, $\delta_2(j)$ --
Line 35, delete "$\leq j_1 \leq j$, $0 \leq s \leq Min\{Size(i), Size(j)\}$." and insert -- $\leq j_1 \leq j$, $0 \leq s \leq Min\{Size(i), Size(j)\}$ --

Column 6
Line 7, delete "$10^{-1}$" and insert -- $10^{-3}$ --

Column 11
Line 47, delete "$Anc(i)=\{f^k(i)|0 \leq k \leq Depth(i)\}$." and insert -- $Anc(i)=\{f^k(i)|0 \leq k \leq Depth(i)\}$. --
Line 60, delete "some $0 \leq i \leq j \leq k$," and insert -- some $0 \leq i \leq j \leq k$, --

Column 12
Line 9, delete "Let $d(x,y) \geq 0$" and insert -- Let $d(x,y) \geq$ --
Line 15, delete "$d(x,y) \geq 0$;" and insert -- $d(x,y) \geq 0$; --
Line 19, delete "$d(x,z) \leq d(x,y)+d(y,z)$" and insert -- $d(x,z) \leq d(x,y)+d(y,z)$ --
Line 25, delete "for $1 \leq i \leq k$. The" and insert -- for $1 \leq i \leq k$. The --
Line 56, delete "(i) $1 \leq i \leq |T_1|$, $1 \leq j \leq |T_2|$;" and insert -- (i) $1 \leq i \leq |T_1|$, $1 \leq j \leq |T_2|$; --

Column 13
Line 5, delete "cos t (M)" and insert -- cost (M) --
Line 17, delete "cost (M) $\leq$ W(S)." and insert -- cost (M) $\leq$ W(S). --

Column 14
Line 29, delete "$X_+$" and insert -- $X^+$ --

Column 15
Line 8, delete "of" and insert -- if --
Line 35, delete "$1 \leq i \leq |T_1|$, $1 \leq j \leq |T_2|$, and" and insert -- $1 \leq i \leq |T_1|$, $1 \leq j \leq |T_2|$, and --
Line 36, delete "$1 \leq s \leq Min\{|T_1|, |T_2|\}$." and insert -- $1 \leq s \leq Min\{|T_1|, |T_2|\}$. --

Column 16
Line 5, delete "(I)" and insert -- (j) --

UNITED STATES PATENT AND TRADEMARK OFFICE
CERTIFICATE OF CORRECTION

PATENT NO. : 7,278,026 B2
APPLICATION NO. : 10/321472
DATED : October 23, 2007
INVENTOR(S) : Oommen It is certified that error appears in the above-identified patent and that said Letters Patent is hereby corrected as shown below:

Column 18
Line 60, delete "$[i_1,j_1,s], \delta_1(i) \leq i_1 \leq i, \delta_2(j) \leq j_1 \leq j,$" and insert -- $[i_1,j_1,s], \delta_1(i) \leq i_1 \leq i, \delta_2(j) \leq j_1 \leq j,$ --
Line 61, delete "$0 \leq s \leq Min\{Size(i), Size(j)\}.$" and insert -- $0 \leq s \leq Min\{Size(i), Size(j)\}.$ --

Column 20
Line 49, delete "$max\{0, M-N\} \leq i \leq q \leq M,$" amd insert -- $max\{0, M-N\} \leq i \leq q \leq M,$ --
Line 51, delete "$0 \leq e \leq r \leq N,$" and insert -- $0 \leq e \leq r \leq N,$ --
Line 53, delete "$0 \leq s \leq R.$" and insert -- $0 \leq s \leq R.$ --
Line 58, delete "$H_i = \{j | max\{0, M-N\} \leq j \leq M\},$" and insert -- $H_i = \{j | max\{0, M-N\} \leq j \leq M\},$ --
Line 60, delete "$H_e = \{j | 0 \leq j \leq N\},$ and," and insert -- $H_e = \{j | 0 \leq j \leq N\},$ and, --
Line 62, delete "$H_s = \{j | 0 \leq j \leq Min\{M,N\}\}.$" and insert -- $H_e = \{j | 0 \leq j \leq Min\{M,N\}\}.$ --

Column 21
Line 4, delete "$\{(q-s, r-s, s) | 0 \leq s \leq Min\{M,N\}\}.$" and insert
-- $\{(q-s, r-s, s) | 0 \leq s \leq Min\{M,N\}\}.$ --
Line 22, delete "and $Q_e = \{j | j \epsilon H_e, j \leq k\}.$" and insert -- and $Q_3 = \{j | j \epsilon H_e, j \leq k\}.$ --

Column 23
Line 20, delete "$\_F_{13}$" and insert -- $\_F\_$ --

Column 24
Line 8, delete "since $k \leq j.$" and insert -- since $k \leq j.$ --

Column 25
Line 35, delete "$Const\_T\_Wt(i,j,s_2) \leq Const\_F\_Wt(T_1[\delta(i)$" and insert
-- $Const\_T\_Wt(i,j,s_2) \leq Const\_F\_Wt(T_1[\delta(i)$ --
Line 47, delete "$0 \leq s_2 \leq s,$" and insert -- $0 \leq s_2 \leq s,$ --

Column 26
Line 23, delete "$\delta(i) \leq h \leq i, \delta(j) \leq k \leq j,$ and" and insert -- $\delta(i) \leq h \leq i, \delta(j) \leq k \leq j,$ and --
Line 25, delete "$0 \leq s' \leq s = Min$" and insert -- $0 \leq s' \leq s = Min$ --
Line 36, delete "$1 \leq x_1 \leq i - \delta(i) + 1, 1 \leq y_1 \leq j - \delta(j) + 1:$" and insert
-- $1 \leq x_1 \leq i - \delta(i) + 1, 1 \leq y_1 \leq j - \delta(j) + 1:$ --

UNITED STATES PATENT AND TRADEMARK OFFICE
CERTIFICATE OF CORRECTION

PATENT NO.        : 7,278,026 B2
APPLICATION NO.   : 10/321472
DATED             : October 23, 2007
INVENTOR(S)       : Oommen It is certified that error appears in the above-identified patent and that said Letters Patent is hereby corrected as shown below:

Column 40
Line 30, delete "maethod" and insert -- method --

Signed and Sealed this

Third Day of June, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,278,026 B2 | Page 1 of 1 |
| APPLICATION NO. | : 10/321472 | |
| DATED | : October 2, 2007 | |
| INVENTOR(S) | : Tim McGowan | |

It is certified that error appears in the above-identified patent and that said Letters Patent is hereby corrected as shown below:

This certificate supersedes the Certificate of Correction issued June 3, 2008. The certificate should be vacated since request for Certificate of Correction was not granted for this patent number.

Signed and Sealed this

First Day of July, 2008

JON W. DUDAS
*Director of the United States Patent and Trademark Office*